(12) United States Patent
Newhouse

(10) Patent No.: US 8,870,190 B1
(45) Date of Patent: Oct. 28, 2014

(54) TONNEAU COVER SEAL

(75) Inventor: Norman L. Newhouse, Mishawaka, IN (US)

(73) Assignee: Lifetime Industries, Inc., Rogers, MN (US)

( * ) Notice: Subject to any disclaimer, the term of this patent is extended or adjusted under 35 U.S.C. 154(b) by 414 days.

(21) Appl. No.: 13/189,093

(22) Filed: Jul. 22, 2011

(51) Int. Cl.
*F16J 15/02* (2006.01)

(52) U.S. Cl.
USPC ............................................. 277/637

(58) Field of Classification Search
CPC ............................... F16J 15/0887; F16J 15/46
USPC ......... 277/644, 645, 646, 647, 634; 49/490.1, 49/492.1, 493.1, 483.1, 496.1; 296/100.1, 296/136.03
See application file for complete search history.

(56) References Cited

U.S. PATENT DOCUMENTS

| | | | |
|---|---|---|---|
| 5,460,423 A * | 10/1995 | Kersting et al. | 296/100.18 |
| 5,636,893 A * | 6/1997 | Wheatley et al. | 296/100.07 |
| 6,527,330 B1 * | 3/2003 | Steffens et al. | 296/100.07 |
| 7,066,523 B2 * | 6/2006 | Verduci et al. | 296/100.06 |
| 7,093,881 B2 * | 8/2006 | Rusu | 296/100.07 |
| 2003/0151212 A1 * | 8/2003 | Hahn | 277/650 |
| 2005/0179217 A1 * | 8/2005 | Kuzuya et al. | 277/644 |

* cited by examiner

*Primary Examiner* — Vishal Patel
*Assistant Examiner* — Nathan Cumar
(74) *Attorney, Agent, or Firm* — Botkin & Hall, LLP; Michael D. Marston

(57) ABSTRACT

A seal that is particularly useful in sealing tonneau covers to the bed of a vehicle to which the tonneau cover is attached. The bed typically has upstanding walls with upper surfaces that define a top of the bed. The seal has a fixed base that is designed to be mounted to upper surfaces of the bed. A separate seal section has a first mounting portion adapted for connecting to the fixed base. A resilient member extends from the first mounting portion and terminates in a second mounting portion. The second mounting portion is adapted to be affixed to the tonneau cover. When the seal section is in its relaxed, uninstalled state the seal has a substantially S-shaped configuration. When the seal is installed on the tonneau cover and connected to the fixed base on one of the upper surfaces, the seal is U-shaped extending underneath the tonneau cover.

9 Claims, 2 Drawing Sheets

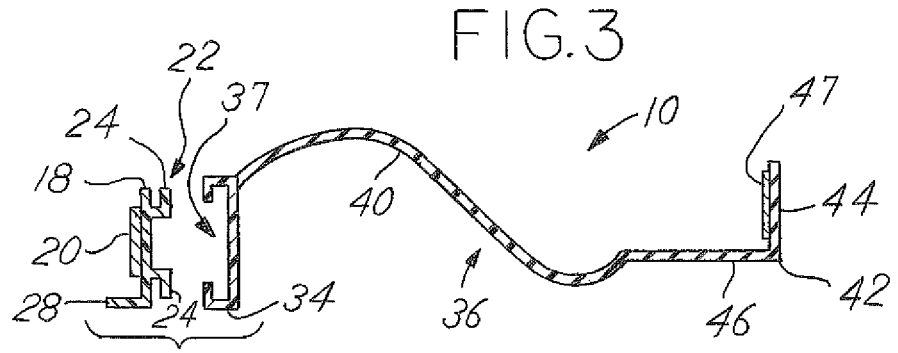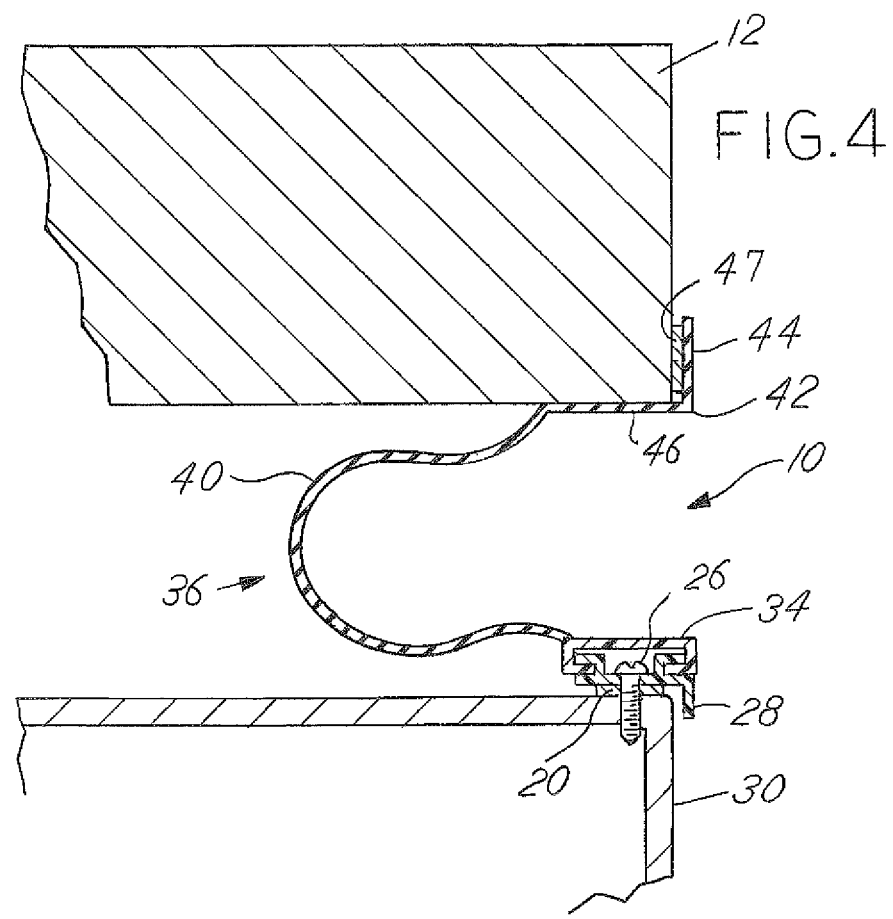

TONNEAU COVER SEAL

BACKGROUND OF THE INVENTION

Sealing a tonneau cover is important to its usefulness. A seal to accomplish this should prevent all water from getting beneath the cover, yet be easily removed for times when it is desired to remove the cover. It is of particular importance to seal the connection of the tonneau cover to the front of the bed behind the cab of the vehicle to which it is attached because, when a vehicle is driven in rain, water is very likely to be forced under the tonneau cover at that location. Prior art foam tapes and gaskets often fail or work poorly at that location from the time they are initially installed.

SUMMARY OF THE INVENTION

The present invention is a seal that is particularly useful in sealing tonneau covers to the bed of a vehicle to which the tonneau cover is attached. The bed typically has upstanding walls with upper surfaces that define a top of the bed. The seal has a fixed base that is designed to be mounted to upper surfaces of the bed. A separate seal section has a first mounting portion adapted for connecting to the fixed base. A resilient member extends from the first mounting portion and terminates in a second mounting portion. The second mounting portion is adapted to be affixed to the tonneau cover. When the seal section is in its relaxed, uninstalled state the seal has a substantially S-shaped configuration. When the seal is installed on the tonneau cover and connected to the fixed base on one of the upper surfaces, the seal is U-shaped extending underneath the tonneau cover.

The connection between the fixed base may be a tongue and groove type connection that allows for a snap or sliding fit. Such a connection prevents water from entering beneath the tonneau cover due to the circuitous path water must traverse to penetrate such a connection.

The fixed base and second mounting portions may be attached to the upper surface and tonneau cover respectively using adhesive tape. Additionally, screws or other mechanical fasteners may be driven into the fixed base then into the upper surface to more solidly connect the two.

BRIEF DESCRIPTION OF THE DRAWINGS

FIG. 3 is an exploded sectional view of the seal section and fixed base, with the seal section in its first S-shaped position; and FIG. 4 is a sectional view showing the seal of FIG. 2 in a partially compressed state where the tonneau cover is partially raised above the upper surface of a wall of the bed.

DETAILED DESCRIPTION OF INVENTION

Figure 1:
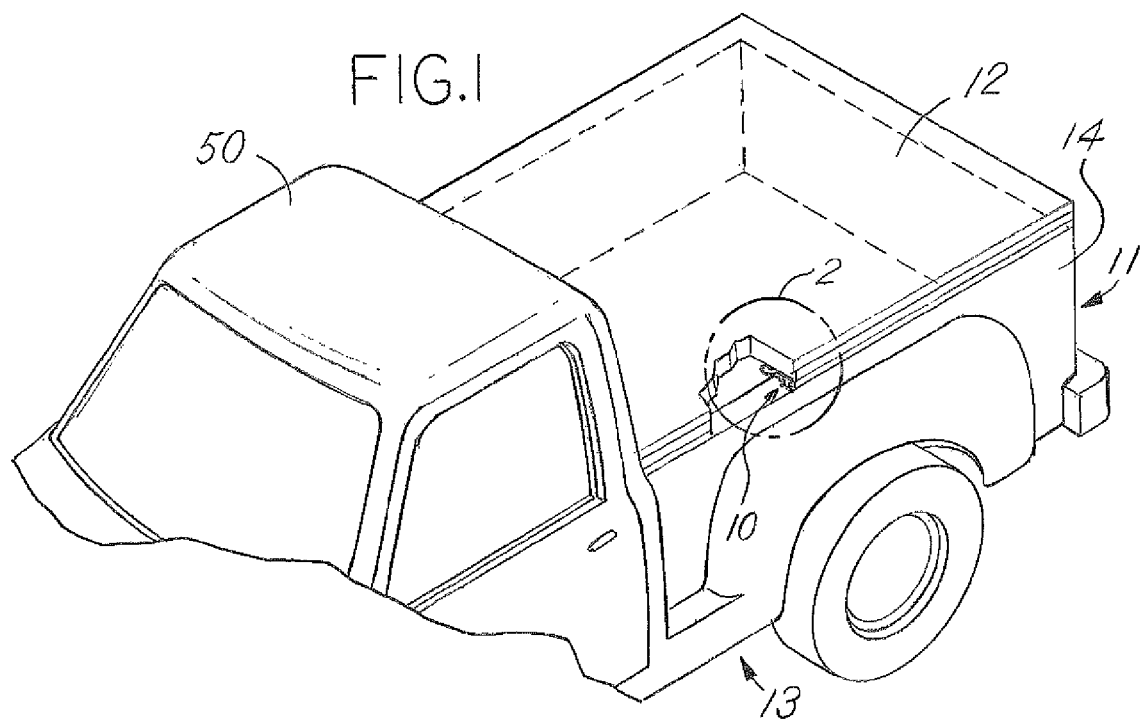
FIG. 1 is a perspective of a pick-up truck with a tonneau cover.

The present invention is a seal 10 particularly useful in sealing tonneau covers 12 used for pick-up truck 13 beds 11. A typical pick-up truck 13 has a bed 11 with upstanding walls 14 and each wall 14 has an upper surface 16 that defines the top of the bed 11.

The seal 10 has a fixed base 18 that is designed to be affixed to the upper surfaces 16 of the bed 11. The fixed base 18 is designed to be held to the upper surface 16 on which it rests by a strip of adhesive tape 20 that runs the entire length of the base 18. A tongue connector 22 is located on the upper side of the base 18. The tongue connector 22 is made of two oppositely L-shaped tabs 24 pointing outwardly from the base 18. Mechanical fasteners such as screws 26 may be driven through the base 18 between the tabs 24 into the upper surface 16 to assist the tape 20 in securing the fixed base 18 to the upper surface 16. The base 18 has a flange 28 that may be used to assist placing the base near an outer surface 30 of a wall 14.

A separate seal section 36 is adapted for being connected to the fixed base. The seal section 36 has a general S-shape, as shown in FIG. 3, which corresponds to the position of the seal before it is installed. The seal section 36 has a first mounting portion 34 adapted for being connected to the fixed base 18. The first mounting portion has a groove connector 37. The groove connector 37 is defined by two inwardly pointing L-shaped tabs 34 that define the groove. The first mounting portion 34 is adapted for a snap fit or sliding fit with the fixed base 18. A resilient member 40 extends from the first mounting portion integrally into a second mounting portion 42. The second mounting portion 42 is L-shaped and has a mounting leg 44 and a locating leg 46. The mounting leg 44 is adapted for being affixed to the tonneau cover 12 using a strip of adhesive tape 47, and the locating leg is used to abut the tonneau cover 12 to locate the second mounting portion 42 along an edge, as shown in FIG. 4. The resilient member 40 connects to the first mounting portion 34 at such an angle that the resilient member 40 has a curved portion above the first mounting portion 34 and connects to the locating leg 46 of the second mounting portion 42 at an angle from below so that a portion of the resilient member 40 is below the second mounting portion 42. The second mounting portion 42 has an adhesive strip 47 that is adapted for making a watertight seal against the tonneau cover 12, as shown in FIG. 4.

Both the first mounting portion 34 and second mounting portions 42 are made from a material that is somewhat resilient yet fairly rigid so that it will maintain its shape and flex enough to allow snap fitting the first mounting portion 34 to the fixed base 18. The resilient member 40 is made of a material having a lower durometer than either the first mounting portion 34 or second mounting portion 42.

Figure 2:
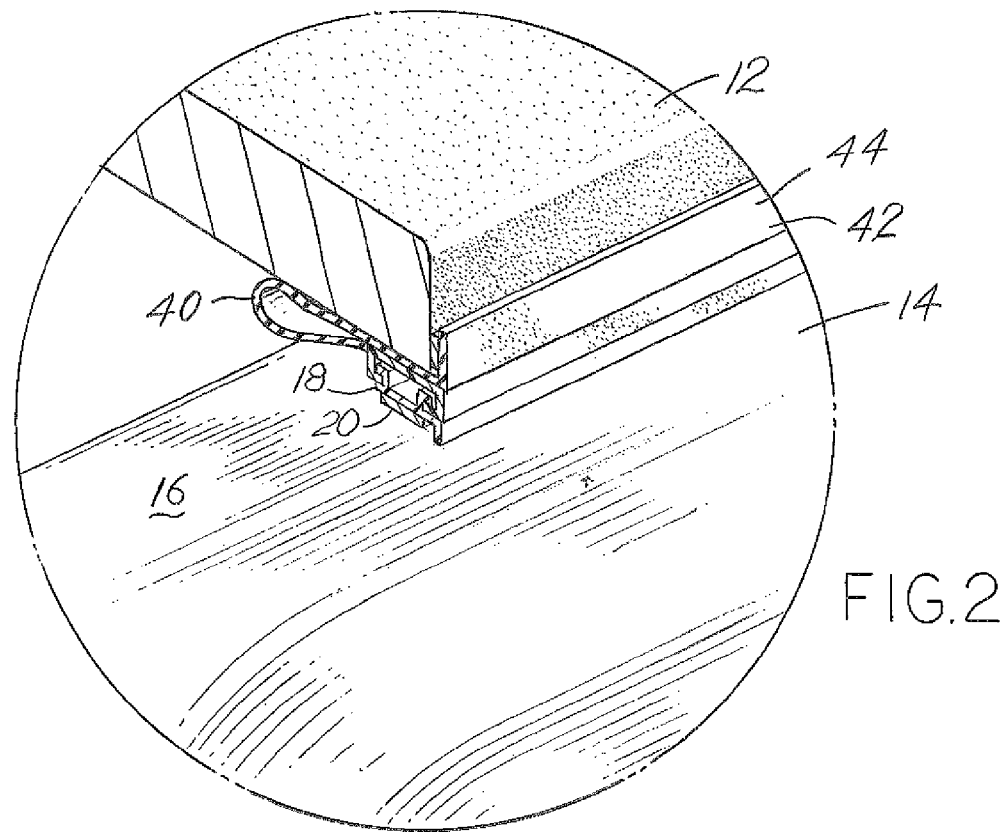
FIG. 2 is a magnified sectional view taken about area 2 in FIG. 1.

When a user of the seal 10 wishes to install it, he will typically first install the fixed base 18. This is done by peeling a protective layer off the adhesive tape 20 and adhering it to the upper surfaces 16 of the bed 11. Screws 26 may be driven between the tabs 24 if the user desires a more secure connection of the fixed base to the bed 11. Segments of the fixed base 18 extend along the upper surfaces 16 around the perimeter of the bed 11. The seal section 36 is then installed on the tonneau cover 12 by peeling a protective layer of the adhesive tape 47 and adhering it to the tonneau cover, as shown in FIG. 4. The second mounting portion 42 is then bent down from the left, as shown in FIG. 3, to the right so it is substantially aligned with the first mounting portion 34. In this position, the seal 10 has a U-shaped configuration. The angles at which the resilient member 40 joins with the first mounting portion 34 and second mounting portion 42 point the resilient member 40 inwardly toward the center of the U-shape. This is done to provide repeatable and reliable folding of the seal section 36 inwardly underneath the tonneau cover 12. Folding the seal section under the tonneau cover 12 provides a cleaner appearance, particularly when the tonneau cover rests upon the bed 11, as shown in FIG. 2. In this position, the first and second mounting portions 34, 42 contact each other and the fixed base 18 bears the weight of the cover 12. The adhesive strips 20 and 47 provide watertight seals against the tonneau cover 12 and upper surfaces 16 of the bed 11 respectively. Water is further prevented from penetrating beneath the tonneau cover 12 due to the tongue and groove connection between the first mounting portion 34 and fixed base 18. This is particularly useful for the upper surface 16 immediately behind the cab 50 of the truck 13 because rain can be driven into the seal 10 at that location during driving. The configuration of the seal 10 of this invention is particularly forgiving to misalignment or unevenness of the cover 12 due to the slack in the resilient member 40.

The invention is not limited to the details given above, but may be modified within the scope of the following claims.

What is claimed is:

1. A tonneau cover seal for use in combination with a tonneau cover that is used to cover a bed of a vehicle, said bed having upstanding walls and upper surfaces defining a top of said bed, said seal comprising:
    a fixed base adapted for being mounted to said upper surface of one of said walls of said bed, said fixed base including a pair of L-shaped tabs, extending upwardly from said fixed base, said tabs pointing outwardly with respect to each other to form a tongue;
    a separate seal section being a single unitary element having a first mounting portion, a U-shaped resilient member and a second mounting portion, said first mounting portion adapted for connecting to said fixed base, said first mounting portion including a pair of L-shaped tabs pointing inwardly to form a groove, said tabs on said mounting portion adapted for mating with said tabs on said base to form an interlocking tongue and groove fit;
    said U-shaped resilient member extending from said first mounting portion inwardly beneath said tonneau cover and terminating in a second mounting portion adapted for mounting to said tonneau cover, said second mounting portion being L-shaped and having a mounting leg adapted for being affixed to said tonneau cover and a locating leg being substantially perpendicular to said mounting leg.

2. A tonneau cover seal as claimed in claim 1, wherein said resilient member is made of a material having a lower durometer than said first mounting portion and second mounting portion of said seal section.

3. A tonneau cover seal as claimed in claim 2, wherein said fixed base includes an adhesive strip for mounting to said upper surface of said walls.

4. A tonneau cover seal as claimed in claim 2, wherein said fixed base includes mechanical fasteners for mounting to said upper surface.

5. A tonneau cover seal as claimed in claim 4, wherein said fixed base includes a downwardly pointing flange for extending along an outer surface of one of said walls.

6. A tonneau cover seal for use in combination with a tonneau cover used to cover a bed of a vehicle, said bed having upstanding walls and upper surfaces defining a top of said bed, said seal comprising:
    a seal section being a single unitary element having a first mounting portion, a U-shaped resilient member and a second mounting portion, said first mounting portion adapted for being connected to a fixed base mounted to an upper surface of said bed;
    a resilient member extending from said first mounting portion and terminating in a second mounting portion being L-shaped and having a mounting leg adapted for being secured to said tonneau cover, said seal section having a first position with a general S-shape, said seal section having a second position wherein said first mounting portion is spaced beneath and substantially aligned with said second mounting portion and said seal has a general U-shape with said resilient member extending beneath said tonneau cover, one of said first mounting portion and said fixed base including a tongue connector including a pair of L-shaped legs pointing outwardly with respect to each other to define said tongue and said other of said first mounting portion and said fixed base having a pair of L-shaped legs pointing inwardly to form an interlocking fit when said second mounting and said fixed base are joined.

7. A tonneau cover seal as claimed in claim 6, wherein said resilient member is made of a material having a lower durometer than said first mounting portion and second mounting portion of said seal section.

8. A tonneau cover seal as claimed in claim 7, wherein said fixed base includes an adhesive strip for mounting to said upper surface of said walls.

9. A tonneau cover seal as claimed in claim 8, wherein said fixed base includes mechanical fasteners for mounting to said upper surface.

* * * * *